Patented Dec. 11, 1951 2,577,796

UNITED STATES PATENT OFFICE 2,577,796

UNSATURATED ESTERS OF PHOSPHONOUS ACIDS AND POLYMERS THEREOF

Rupert C. Morris, Berkeley, Vernon W. Buls, Walnut Creek, and Seaver A. Ballard, Orinda, Calif., assignors to Shell Development Company, San Francisco, Calif., a corporation of Delaware No Drawing. Application November 28, 1950, Serial No. 198,046

9 Claims. (Cl. 260—78.5)

This invention relates to new organic compounds containing phosphorus. More particularly, the present invention relates to new phosphonous acid derivatives, and it still more particularly relates to new, polymerizable, olefinically unsaturated phosphonous acid esters.

An object of the present invention is to provide a new class of organo-phosphorus compounds, namely, allyl-type phosphonites or beta,gamma-olefinically unsaturated phosphonites. A more specific object of the invention is to provide diallyl phosphonites as a new type of organo-phosphorus compound. New, polymerizable phosphorus-containing organic compounds which are useful as intermediates for the preparation of new and useful polymers containing phosphorus form a further object of the invention, while still other and related objects of the invention will become apparent from the nature of the disclosures and claims hereinafter.

The foregoing and related objects of this invention have now been accomplished by providing allyl-type, or beta-gamma-olefinically unsaturated, phosphonites. The phosphonous acids are, broadly speaking, those dibasic phosphorus-containing acids which contain a trivalent atom of phosphorus and in which two of the three valencies of a trivalent atom of phosphorus are satisfied by acidic groups, e. g., —OH or —SH groups, and the third valency of the trivalent atom of phosphorus is satisfied by direct attachment to an organic radical by linkage in a carbon-to-phosphorus bond. The present invention is concerned with one particular new type of phosphonite, namely, the phosphonous acid esters in which the hydrogen atoms of the acidic groups that are directly linked to the trivalent phosphorus atom are replaced by the radical denoted by $R^1$ of a beta,gamma-olefinically unsaturated alcohol, denoted by $R^1OH$.

The new esters that are provided by the present generic invention have structures that conform to the general structural formula $$R{-}P\begin{matrix}\diagup X{-}R^1 \\ \diagdown X{-}R^1\end{matrix}$$

in which R represents the organic radical that is joined to the trivalent atom of phosphorus by a phosphorus-to-carbon bond, X represents an atom of oxygen or sulfur, and $R^1$ represents the beta,gamma-olefinically unsaturated radical $R^1$ of a beta,gamma-olefinically unsaturated alcohol $R^1OH$. In the present specification and claims the esters represented by the above formula will be referred to generically as phosphonites, the term including both those esters represented by the formula when the atoms denoted by X are sulfur and those esters represented by the formula when the atoms denoted by X are oxygen.

In the preferred compounds of the invention the radical denoted by $R^1$ is a beta,gamma-olefinically unsaturated aliphatic hydrocarbon radical in which the beta,gamma-olefinic bond is the only unsaturated bond. A preferred subgroup of the novel phosphonites of the invention is represented by the formula $$R{-}P(O{-}CR^2_2{-}CR^2{=}CR^2_2)_2$$

in which each $R^2$ is a hydrogen atom or an alkyl group containing up to six carbon atoms.

The alpha,beta-olefinically unsaturated phosphonites of the invention are particularly useful as intermediates which by polymerization, alone or conjointly with other polymerizable compounds containing a polymerizably reactive ethylenic bond, can be converted to new and useful polymers. The characteristics of the polymers, which will range from viscous liquids to hard solids, will depend upon the particular beta,gamma-olefinically unsaturated phosphonite of the invention that is polymerized, upon the other monomer or monomers, if any, polymerized therewith, as well as upon the conditions under which the polymerization is effected. From the standpoint of their use as polymerizable monomers, the beta,gamma-olefinically unsaturated phosphonites of the invention may be regarded as falling within one of the following two subgroups:

1. Those phosphonites defined by the first of the two formulas given above when the beta,gamma-olefinically unsaturated linkages in the radicals denoted by $R^1$ are the only aliphatic unsaturated linkages in the molecule. The beta,gamma-olefinically unsaturated phosphonites of this subgroup are represented by the following compounds, among others: diallyl benzenephosphonite; dimethallyl isopropylbenzenephosphonite; diallyl cyclohexanephosphonite; allyl methallyl benzenephosphonite; bis(2-ethylallyl) butanephosphonite; dicrotcyl 2-ethylhexane-1-phosphonite; bis(2-chloroallyl) p-chlorobenzenephosphonite; diallyl 2-phenylethane-1-phosphonite; dimethallyl benzenephosphonite; dimethallyl p-methylbenzenephosphonite; bis(2-isopropyl-2-pentenyl) benzenephosphonite; bis-(methylvinylcarbinyl) benzenephosphonite; diallyl benzenedithiophosphonite; diallyl butanedithiophosphonite; dimethallyl p-isopropylbenzenedithiophosphonite; and bis(2,3-dichloroallyl) p-chlorobenzenedithiophosphonite. In the preferred esters of this subgroup the beta,gamma-olefinically unsaturated radical denoted by $R^1$ in the first of the two formulas given above preferably is a 2-alkenyl radical and it most desirably is a 2-alkenyl radical wherein the carbon atom in the No. 3 position is the carbon atom of a $=CH_2$ group, i. e., a 2-methylidenealkyl group. The organic radical that is directly linked to the phosphorus atom by a carbon-to-phosphorus bond may be, for example, alkyl, aryl, aralkyl or alkaryl, and it preferably is aryl, e. g., benzene. The organic radical that is directly linked to the phosphorus atom by a carbon-to-phosphorus bond may be substituted by one or more groups or atoms comprising, for example, atoms of one or more of the elements oxygen, nitrogen, halogen, etc., or more preferably it may be composed only of atoms of carbon and hydrogen.

2. The phosphonites defined by the first of the foregoing formulas when each of the radicals represented by R and $R^1$ is an olefinically unsaturated radical. Representative compounds within this second subgroup are as follows: diallyl 2-propene-1-phosphonite; dimethallyl 2-methyl-2-propene-1-phosphonite; dicrotyl 2-propene-1-phosphonite; dicinnamyl 3-cyclohexyl-2-propene-1-phosphonite; diallyl 3-pentene-2-phosphonite; dimethallyl 2-isobutyl-2-butene-1-phosphonite; diethallyl 4-methoxy-2-butene-1-phosphonite; di(methylethylvinylcarbinyl) 2-propene-1-phosphonite; diallyl 2-propene-1-dithiophosphonite; and dimethallyl 4-pentene-3-dithiophosphonite. Although the generic invention is not limited thereto, in the preferred compounds of this subgroup the organic radical that is directly linked to the phosphorus atom by a carbon-to-phosphorus bond preferably is a beta,gamma-olefinically unsaturated radical, that is, the carbon-to-phosphorus bond preferably joins the phosphorus atom to a saturated carbon atom, which, in turn, is directly attached by a univalent bond to an olefinic carbon atom.

The beta,gamma-olefinically unsaturated phosphonites of the invention can be prepared, e. g., by reacting a dihalophosphine or phosphonous acid dihalide wherein the organic radical that is bonded to the phosphorus atom corresponds to the organic radical that, in the desired ester, is linked to the phosphorus atom by a carbon-to-phosphorus bond, with the selected beta,gamma-olefinically unsaturated alcohol or mercaptan, preferably in the presence of an acid-sequestrant, such as pyridine, N,N-dimethylaniline, or other suitable base. The reaction, which occurs readily upon mixing the desired reactants in liquid state at or about room temperature, preferably is carried out in the presence of an excess of the beta,-gamma-olefinically unsaturated alcohol or mercaptan, e. g., in the presence of from about 3 to about 10 moles of the alcohol or mercaptan per mole of the dihalophosphine. The dihalophosphines can, in turn, be prepared by known methods, for example, by reacting an aromatic hydrocarbon or other aromatic compound with $PCl_3$ or $PBr_3$ in the presence of $AlCl_3$ or by reaction of mercury or cadmium alkyls with $PCl_3$ or $PBr_3$.

The preparation of selected beta,gamma-olefinically unsaturated phosphonites of the invention will be illustrated by the following examples. It will be appreciated that numerous specific embodiments of the invention are possible, and that the scope of the invention as illustrated in the examples is not intended to be a limitation upon the scope of the invention claimed.

*Example I.—Diallyl benzenephosphonite*

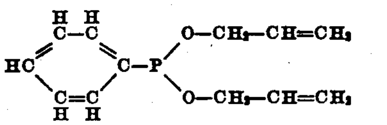

To a glass flask equipped with a mechanical stirrer and surrounded by a cooling-jacket through which tap-water is run, there are added 290 grams of allyl alcohol and 396 grams of pyridine. There are added over a period of 30 minutes 358 grams of benzenephosphonous dichloride while the mixture is vigorously stirred and cooled. After addition of the benzenephosphonous dichloride is completed, the mixture is stirred for an additional hour. Pyridine hydrochloride, which has precipitated from the mixture, is removed by filtration and the filtrate is fractionally distilled under reduced pressure. Diallyl benzenephosphonite is recovered as a water-white stable liquid distilling at 100° C. under a pressure of 0.3 mm. Hg. When the molecular weight of a sample of the diallyl benzenephosphonite is determined (ebulliometrically in benzene) there is obtained the value of 224. The calculated molecular weight of diallyl benzenephosphonite is 222.

The "pour-point" of a sample of the diallyl benzenephosphonite prepared in Example I is determined by the method described in "1947 Supplement to Book of A. S. T. M. Standards," Part III-A, page 1. The pour-point of the diallyl benzenephosphonite is found to be below −65° F.

The absolute viscosity of a sample of the diallyl benzenephosphonite is determined at 100° F. and at 210° F. The following values are found:

| Temperature | Viscosity in Centistokes |
|---|---|
| ° F. | |
| 100 | 2.68 |
| 210 | 1.05 |

The viscosity index of the diallyl benzenephosphonite, calculated according to the Hardiman and Nissan System, is found to be 216.

*Example II.—Diallyl p-chlorobenzenephosphonite*

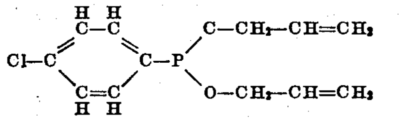

To a glass flask equipped with mechanical stirrer and cooling-jacket there are added 580 parts of allyl alcohol and 750 parts of pyridine. There then are added 1060 parts of p-chlorobenzenephosphonous dichloride in the manner of the foregoing example and the mixture then is stirred for an additional hour. Precipitated pyridine hydrochloride is removed by filtration, and the filtrate is fractionally distilled, the product fraction, comprising diallyl p-chlorobenzenephosphonite, being collected separately. A redistilled fraction of the diallyl p-chlorobenzenephosphonite thus prepared is found to have a molecular weight (ebulliometrically in benzene) of 210, compared to a calculated value of 213.2.

*Example III.—Dimethallyl p-isopropylbenzenephosphonite*

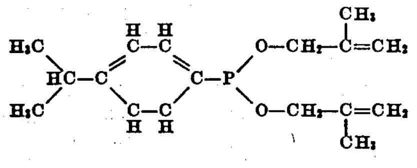

To a mixture of 720 parts of methallyl alcohol and 890 parts of pyridine there are slowly added, with agitation and cooling, 1105 parts of p-isopropylbenzenephosphonous dichloride. The mixture is stirred for two hours after all of the p-isopropylbenzenephosphonous dichloride is added, and then filtered and the filtrate is fractionally distilled under reduced pressure. The recovered dimethallyl p-isopropylbenzenephosphonite is found after redistillation to have a molecular weight of 280 compared to the calculated value of 292.

*Example IV.—Bis(methylisobutenylcarbinyl) 2,4,6-trimethylbenzenephosphonite*

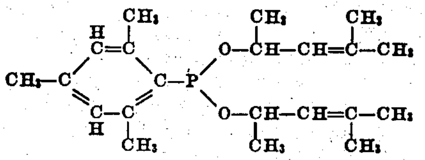

To a mixture of 1000 parts of methylisobutenylcarbinol and 890 parts of pyridine there are added 1000 parts of 2,4,6-trimethylbenzenephosphonous dichloride. The mixture is stirred for about three hours at room temperature and then filtered. Unreacted methylisobutenylcarbinol is flashed from the filtrate under reduced pressure leaving a higher-boiling mixture containing as its major constituent bis(methylisobutenylcarbinyl) 2,4,6-trimethylbenzenephosphonite.

*Example V.—Diallyl isopentanephosphonite*

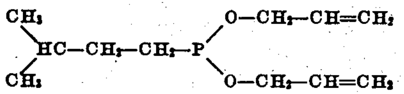

Diallyl isopentanephosphonite is prepared by slowly adding 864 parts of isopentanephosphonous dichloride to a mixture of 580 parts of allyl alcohol and 790 parts of pyridine, filtering off precipitated pyridine hydrochloride, and fractionally distilling under reduced pressure.

*Example VI.—Diallyl benzenedithiophosphonite*

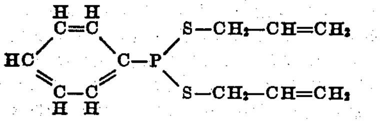

Diallyl benzenedithiophosphonite is prepared from benzenephosphonous dichloride and allyl mercaptan according to the method illustrated in the foregoing examples.

In addition to the specific illustrative compounds shown in the foregoing examples, other esters of phosphonous acids with beta,gamma-olefinically unsaturated alcohols include, for example, the esters obtainable by reaction of beta,-gamma-olefinically unsaturated alcohols with phenylmethanephosphonous dichloride, such as diallyl phenylmethanephosphonite, dicrotyl phenylmethanephosphonite, and dicinnamyl phenylmethanephosphonite; with 2-chlorooctanephosphonous dichloride, such as diallyl 2-chlorooctanephosphonite, bis(2-cyclohexenyl) 2-chlorooctanephosphonite, and di-methallyl 2-chlorooctanephosphonite; with p-methoxybenzenephosphonous dichloride, such as diallyl p-methoxybenzenephosphonite and bis(methylisobutenylcarbinyl) p-methoxybenzenephosphonite; with isobutanephosphonous dichloride, such as dimethallyl isobutanephosphonite, diallyl isobutanephosphonite, and bis(2,4-dimethyl-2-pentenyl) isobutanephosphonite; with alpha-naphthalenephosphonous dichloride, such as diallyl alpha-naphthalenephosphonite and dicrotyl alpha-naphthalenephosphonite; and with 3-chloro-4-methylbenzenephosphonous dichloride, such as bis(3-chloroallyl) 3-chloro-4-methylbenzenephosphonite, bis(2-chloroallyl) 3-chloro-4-methylbenzenephosphonite, and diallyl 3-chloro-4-methylbenzenephosphonite.

The beta,gamma-olefinically unsaturated phosphonites that are most useful for the preparation of polymers are those that are defined by the formula

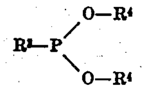

in which $R^3$ is a monovalent hydrocarbon group devoid of polymerizably reactive multiple bonds, such as a monocyclic aromatic hydrocarbon group or a saturated aliphatic hydrocarbon group, and $R^4$ is a 2-methylidenealkyl group containing from 3 to 10 carbon atoms, such as allyl, methallyl or 2-hexylallyl. In the preferred beta,gamma-olefinically unsaturated phosphonites the group represented by $R^3$ contains up to 10 carbon atoms.

The alpha,beta-olefinically unsaturated phosphonites provided by the invention are polymerizable alone to produce homopolymers and conjointly with polymerizable ethylenic compounds to produce copolymers. Among the polymerizable ethylenic compounds that may be used in the preparation of such copolymers there are included, in particular, acrylonitrile, methyl methacrylate, methyl alpha-chloroacrylate, diallyl phthalate, vinyl chloride, vinyl acetate, ethyl alloxyacetate, vinylidene chloride, isobutylene, etc. The most suitable polymerizable ethylenic compounds that are used in the preparation of such copolymers contain a vinylidene group ($CH_2{=}C{<}$) or a vinyl group ($CH_2{=}CH{-}$), the free valencies being satisfied by, for example, halogen, ester, hydrogen, hydrocarbon, carboxyl, carbamido, carboalkoxy, or ether linkages. The monoethylenic compounds are most suitable for the preparation of such copolymers with the beta,gamma-olefinically unsaturated phosphonites provided by the invention.

The polymerization (and copolymerization with other polymerizable ethylenic compounds) of the beta,gamma-olefinically unsaturated phosphonites of the invention may be carried out non-catalytically, as by means of heat, actinic light, or both, in the absence of added catalyst. When, as usually will be the case, it is desired to conduct the polymerization with the aid of catalysts, one of the various customarily-used polymerization catalysts may be employed, such as a peroxy compound, e. g., di-tertiary-butyl-peroxide, benzoyl peroxide, tertiary-butyl perbenzoate, acetyl peroxide, 2,2-bis(tertiary-butyl-peroxy)propane, or barium peroxide; a halide-type polymerization catalyst, such as $BF_3$ or $AlCl_3$; or a persulfate, e. g., ammonium persulfate. The polymerization (and copolymerization) may be carried out with the monomer or monomers in bulk, in solution in an organic solvent or solvents, or in an emulsion-type system. When fully polymerized, i. e., infusible, insoluble, resins are to be prepared, they may be formed in one or in a plurality of polymerization stages. For example, when a plurality of polymerization stages is used, the polymerization process may be interrupted at such a point that the polymer is fusible and soluble, and filling materials, solvent, binders, etc., may be added to the partial polymer or the partial polymer may be applied to a material to be treated or coated therewith, and the polymerization then continued to complete the formation of fusible insoluble polymer.

The copolymers of the beta,gamma-olefinically unsaturated phosphonites with other polymerizable ethylenic compounds may contain amounts of the beta,gamma-olefinically unsaturated phosphonite varying over a wide range, e. g., from about 5% to about 95%. When the other polymerizable ethylenic compound is a monoethylenic compound, and it is desired to have copolymers in which the properties of such other polymerizable ethylenic compound are largely retained, the amount of the beta,gamma-olefinically unsaturated phosphonite in the copolymer should be relatively low, e. g., between about 5% and about 25%. Fully polymerized copolymers of the beta,gamma-olefinically unsaturated phosphonite with other polymerizable ethylenic compounds containing upwards from about 50% of the beta,gamma-olefinically unsaturated phosphonite tend to have predominantly properties characteristic of the beta,gamma-olefinically unsaturated phosphonite, and are the preferred copolymers.

The following examples are illustrative of the many possible specific embodiments of the invention as it relates to polymers (including copolymers) of the novel phosphorus-containing esters of the invention.

*Example VII*

A sample of diallyl benzenephosphonite is charged to a glass-lined vessel and heated to 58° C. To the diallyl benzenephosphonite there is added in several portions 1.8% by weight of benzoyl peroxide, while the temperature of the mixture is maintained at about 58° C. Polymerization occurs readily, forming a clear, semisolid resin. The solubility of the resin in various solvents is determined. The polymer is found to be insoluble in mineral oil, acetone, ethyl alcohol, water, benzene, toluene, and dioxane.

*Example VIII*

A copolymer of diallyl benzenephosphonite and diallyl phthalate is prepared by charging a glass-lined vessel with equal parts by weight of diallyl phthalate and diallyl benzenephosphonite, adding 0.5% by weight of 2,2-bis(tertiary butylperoxy)butane and heating at about 100° C. After 12 hours' heating, an additional 0.5% of 2,2-bis(tertiary butylperoxy)butane is added and after an additional 2 hours, a further equal amount is added. The course of the polymerization is followed by determining the refraction index of the mixture at suitable intervals. The following results are observed:

| Time | Refractive Index |
|---|---|
| *Hours* | |
| 0 | 1.5224 |
| 12 | 1.5309 |
| 14 | 1.5389 |
| 16 | 1.5479 |
| 24 | hard, clear resin |

The results of this example show that the copolymerization of diallyl benzenephosphonite with diallyl phthalate proceeds smoothly, is amenable to control, and forms a product that may be used, for example, in surface coatings, as a molding resin, and in allied uses.

The polymers (and copolymers) of the beta,gamma-olefinically unsaturated phosphonites may be used in the preparation of coated, impregnated or laminated fabrics, especially textiles made from cotton, wool, rayon, nylon, or other natural or synthetic fibers. The normally liquid polymers may be stabilized or rendered unreactive toward further polymerization by hydrogenation by treatment with gaseous hydrogen in the presence of hydrogenation catalysts. Such stable liquid polymers are of interest as hydraulic fluids, as lubricants, and as additives useful for improving the properties of lubricating oils of the petroleum variety as well as of the synthetic variety. Such lubricants may comprise gelling agents to provide thickened lubricants, or greases. The gelling agents may be soaps, of the varieties customarily used in the preparation of petroleum greases, or they may comprise inorganic colloidal materials, including silica, magnesia, alumina, oleophilic clay-like materials, and mixtures thereof, in gel form and having an expanded structure resembling that of an aerogel. The monomeric beta,gamma-olefinically unsaturated phosphonites of the invention are of interest as plasticizers, insecticides, fungicides, and like agricultural aids, as additives for lubricants, especially lubricants derived from petroleum, and as chemical intermediates to be used in the synthesis of other organo-phosphorus compounds.

The claimed invention is:

1. Diallyl benzenephosphonite.
2. A diallyl phosphonite.
3. Diallyl 2-propene-1-phosphonite.
4. A phosphonite having a structure defined by the formula $$R-P(OCR^2_2-CR^2=CR^2_2)_2$$

in which R represents the organic radical joined to the phosphorus atom by a carbon-to-phosphorus bond and each $R^2$ represents a member of the class consisting of the hydrogen atom and alkyl groups containing up to six carbon atoms.

5. A phosphonite having a structure defined by the formula $$R-P\begin{matrix}\diagup X-R^1\\ \diagdown X-R^1\end{matrix}$$

in which R represents the organic radical joined to the phosphorus atom by a carbon-to-phosphorus bond, $R^1$ represents a beta,gamma-olefinically unsaturated radical $R^1$ of a beta,gamma-olefinically unsaturated alcohol $R^1OH$, and X represents a member of the class consisting of oxygen and sulfur.

6. Polymeric diallyl benzenephosphonite.
7. A copolymer of diallyl benzenephosphonite and diallyl phthalate.
8. A polymeric diallyl phosphonite.
9. A polymer of a phosphonite defined in claim 5.

RUPERT C. MORRIS.
VERNON W. BULS.
SEAVER A. BALLARD.

No references cited.